United States Patent
Hamchuk et al.

(10) Patent No.: US 11,514,484 B1
(45) Date of Patent: Nov. 29, 2022

(54) AUGMENTED REALITY CHARITABLE GIVING EXPERIENCE

(71) Applicant: Wells Fargo Bank, N.A., San Francisco, CA (US)

(72) Inventors: Robert Glenn Hamchuk, San Jose, CA (US); Debarchana Roy, San Francisco, CA (US); Lisa M. De Paschalis, Orinda, CA (US); Uma Meyyappan, Freemont, CA (US); Marc Le boeuf, San Francisco, CA (US); Stanislav Roumiantsev, Albany, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 444 days.

(21) Appl. No.: 16/723,436

(22) Filed: Dec. 20, 2019

Related U.S. Application Data

(60) Provisional application No. 62/903,401, filed on Sep. 20, 2019.

(51) Int. Cl.
  *G06Q 30/02* (2012.01)
  *G06T 19/00* (2011.01)
  *G06K 19/06* (2006.01)
  *G06F 16/955* (2019.01)

(52) U.S. Cl.
  CPC ..... *G06Q 30/0279* (2013.01); *G06F 16/9554* (2019.01); *G06K 19/06103* (2013.01); *G06T 19/006* (2013.01)

(58) Field of Classification Search
  USPC .................................................. 705/35, 329
  See application file for complete search history.

(56) References Cited

U.S. PATENT DOCUMENTS

| | | |
|---|---|---|
| 8,793,770 B2 | 7/2014 | Lim |
| 8,933,967 B2 | 1/2015 | Huston et al. |
| 9,105,011 B2 | 8/2015 | Calman et al. |
| 10,127,724 B2 | 11/2018 | Carre et al. |
| 2011/0040602 A1* | 2/2011 | Kurani ............... G06Q 30/0203 705/14.19 |

(Continued)

FOREIGN PATENT DOCUMENTS

WO 2018/104581 A1 6/2018

OTHER PUBLICATIONS

Green, "Augmented reality app to drive charitable fundraising," Charity Digital News, https://www.charitydigitalnews.co.uk/2018/05/30/augmented-reality-app-to-drive-campus-fundraising/, pp. 1-8 (May 30, 2018).

(Continued)

*Primary Examiner* — William E Rankins
(74) *Attorney, Agent, or Firm* — Merchant & Gould P.C.

(57) ABSTRACT

An example method for implementing a charitable giving experience can include: receiving a scanned image of a logo of a charity at an augmented reality (AR) electronic device, the logo including a graphic associated with the charity; after receiving the scanned image, displaying at least the logo and details related to the charity on the AR electronic device; displaying a control on the AR electronic device, wherein the control corresponds to one or more charitable giving opportunities associated with the charity; receiving a selection of the control on the AR electronic device; and initiating a charitable giving to the charity from the AR electronic device.

19 Claims, 9 Drawing Sheets

(56) References Cited

U.S. PATENT DOCUMENTS

| | | | |
|---|---|---|---|
| 2018/0075695 | A1 | 3/2018 | Simpson |
| 2018/0300917 | A1 | 10/2018 | Barnett et al. |
| 2018/0349478 | A1 | 12/2018 | Carlisle et al. |
| 2019/0009956 | A1 | 1/2019 | Fitzpatrick |
| 2019/0080377 | A1 | 3/2019 | Serfass et al. |
| 2019/0094981 | A1 | 3/2019 | Bradski et al. |
| 2019/0108499 | A1 | 4/2019 | Liu |
| 2019/0108682 | A1 | 4/2019 | Spivack et al. |
| 2019/0197312 | A1* | 6/2019 | Lahood ............... H04L 67/38 |
| 2019/0220851 | A1 | 7/2019 | Barnes et al. |
| 2020/0151702 | A1* | 5/2020 | Sinha ............... G06Q 20/102 |
| 2020/0279305 | A1* | 9/2020 | Mossoba ............. G06F 3/011 |

OTHER PUBLICATIONS

Ibele, "The Nonprofit's Guide to Augmented Reality (+12 Examples of Inspiring Nonprofit Augmented Reality Campaigns)," Wild Apricot Blog, https://www.wildapricot.com/blogs/newsblog/2018/01/08/augmented-reality-nonprofit, pp. 1-14 (Jan. 8, 2018).

Morozova, "Virtual Reality in Charity," Jasoren, https://jasoren.com/vr-in-charity/, pp. 1-13 (Copyright 2019).

Payscout Announces World's First Donation Made in Virtual Reality: The immersive experience was created for the national non-profit Jefferson Awards Foundation and enables the user to make a frictionless donation without removing the VR headset, PR Newswire, 2 pages (Jan. 9, 2018).

Samir et al., "The Wanderer: Implementing Markerless Augmented Reality with Object Position Awareness," 2018 First International Workshop on Deep and Representation Learning (IWDRL), pp. 31-40 (2018).

* cited by examiner

600

602

Donation Amount

Payment Method:

PayPal [x] —604

Venmo [ ] —606

Zelle [ ] —608

Credit Card [ ] —610

Mobile Wallet [ ] —612

614

Secure ID

616

Submit

618

Cancel

FIG. 6

AUGMENTED REALITY CHARITABLE GIVING EXPERIENCE

BACKGROUND

Businesses want to project a positive image to their customers and be a good citizen in their communities. Businesses also want to promote policies that are consistent with their corporate goals. Promoting giving to charitable organizations is one way in which businesses can be consistent with their values and provide a service to their customers and communities.

SUMMARY

Aspects and embodiments described herein are directed to a method implemented on an augmented realty (AR) electronic device for implementing a charitable giving experience. According to one aspect the method includes: receiving a scanned image of a logo of a charity at the AR electronic device, the logo including a graphic associated with the charity; after receiving the scanned image, displaying at least the logo and details related to the charity on the AR electronic device; displaying a control on the AR electronic device, wherein the control corresponds to one or more charitable giving opportunities associated with the charity; receiving a selection of the control on the AR electronic device; and initiating a charitable giving to the charity from the AR electronic device.

In another aspect, an augmented reality (AR) electronic computing device includes: a camera; a display screen; at least one processor; and system memory, the system memory including instructions which, when executed by the processor, cause the AR electronic computing device to: receive a scanned image of a logo of a charity from the camera, the logo including a graphic associated with the charity; after receiving the scanned image, display at least the logo and details related to the charity on the display screen; display a control on the display screen, wherein the control corresponds to a pledge of money or a donation associated with the charity; receive a selection of the control; and initiate the pledge or the donation to the charity from the AR electronic computing device.

In yet another aspect, a method implemented on an augmented realty (AR) electronic device for implementing a donation of money to a charity includes: receiving a scanned image of a logo of the charity at the AR electronic device, the logo including a graphic associated with the charity; after receiving the scanned image, displaying the logo and a virtual button on the AR electronic device, the virtual button being displayed as an overlay on the logo, wherein the virtual button corresponds to a donation of money to the charity that permits a donation to be made to the charity; receiving a first selection of the virtual button at the AR electronic device; responsive to receiving the first selection of the virtual button, displaying one or more money transfer applications on the AR electronic device, the one or more money transfer applications being installed on the AR electronic device and associated with a user of the AR electronic device; receiving a second selection of one of the money transfer applications; receiving an input indicating a monetary amount for the donation of money; and initiating a transfer of money to the charity for the monetary amount of the donation using the selected one of the money transfer applications.

The details of one or more techniques are set forth in the accompanying drawings and the description below. Other features, objects, and advantages of these techniques will be apparent from the description, drawings, and claims.

DESCRIPTION OF THE DRAWINGS

FIG. 6 shows yet another example GUI that can be rendered on the mobile electronic computing device of FIG. 1.

DETAILED DESCRIPTION

Figure 1:
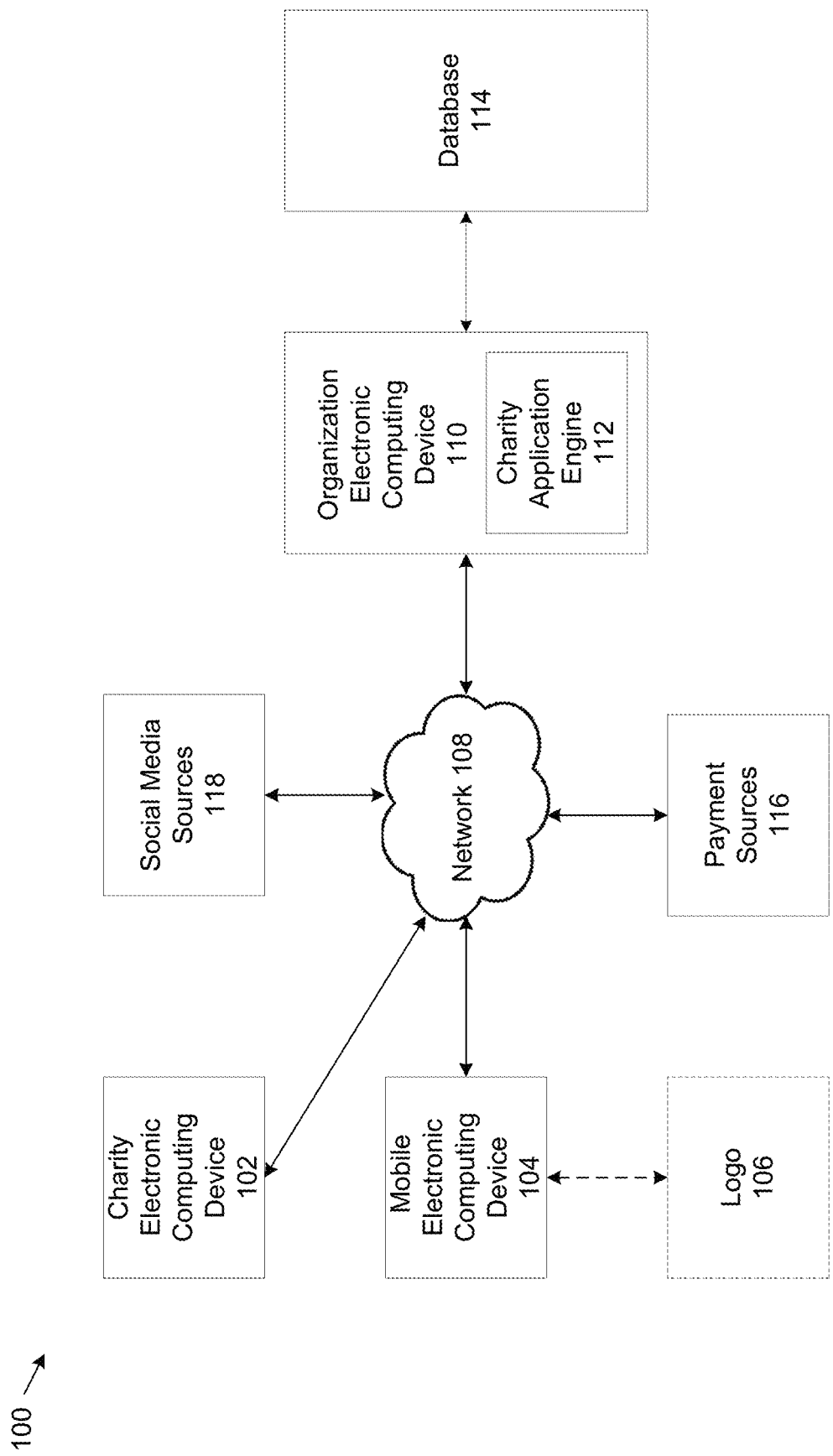
FIG. 1 shows an example system that supports a charitable giving augmented reality experience.

The present disclosure is directed to systems and methods for providing an augmented reality (AR) electronic device to educate individuals about charitable organizations (also referred to herein as charities). In some examples, a user of the AR electronic device can direct the AR electronic device such that a logo for a charitable organization is within a field of view of the AR electronic device. The logo may be located in various locations, such as on a poster, on a display screen, in a magazine, or in some other form of visual display. As a result of directing the AR electronic device such that the logo is within the field of view thereof (and/or focusing the AR electronic device on the logo), information regarding the charitable organization can be overlaid (e.g., augmented) on an image of the logo on the AR electronic device.

The information regarding the charitable organization can include one or more of text, graphics, sound, video, website links, Portable Document Format (PDF) documents, and animations. The information can be integrated into a presentation that can educate the user regarding the charitable organization. The information can also include instructions on how a donation to the charitable organization can benefit the charitable organization. Finally, the AR electronic device can facilitate a donation or a pledge to the charitable organization from the AR electronic device and a financial account of the user.

A pledge is typically a promise to pay the charitable organization that does not involve an immediate transfer of funds to the charitable organization. For example, the pledge could involve a submission of an amount of the promise to pay along with contact information for the user. The user would then typically be contacted at a later time regarding an actual payment of the promised amount. In contrast, as discussed in more detail later herein, a donation typically involves an immediate initiation of a transfer of funds to the charitable organization.

In at least some of the examples provided herein, a software application, with functionality that can support a charitable giving experience, can be installed on the AR electronic device. The AR electronic device can be programmed to identify logos of specific charitable organizations, and can provide an immersive visual and auditory educational experience that includes text, graphics, sound, video, website links, PDF documents, and animations. As further discussed herein, the immersive visual and auditory education experience may be unique to the specific charity that corresponds to the identified logo, and may educate a user of the AR electronic device about the charitable organization. In these examples, information about the charity can be displayed to the user in an augmented reality format on a display screen of the AR electronic device.

The AR electronic device can also provide a mechanism for permitting a pledge or a donation to a charitable organization, and in particular, the charitable organization that corresponds to a logo identified by the AR electronic device. For example, the AR electronic computing device may be configured to display a control, such as a virtual button, the activation of which allows the user of the AR electronic device to make a pledge or a donation to the charitable organization.

In an example implementation, a software application installed on the AR electronic device, when executed by the AR electronic device, causes the AR electronic device to perform the one or more routines and/or operations described herein. The software application can be created on an electronic computing device, for example a workstation or a server computer, of a business organization, using a third party augmented reality software development kit for mobile devices. An example of an augmented reality software development kit for mobile devices is the Vuforia Studio augmented reality software platform from PTC Corporation of Boston, Mass. As described in more detail later herein, charitable organizations can provide information regarding the logos and the educational material for integration into the software application.

In certain examples, when executing the software application, the AR electronic device enables a user of the AR electronic device to pledge or donate money to a charitable organization. As explained in more detail later herein, the pledges or donations can be made to the charitable organization via an intermediary business organization (e.g., a bank), or may be made by a third party money transfer application, such as PayPal, Venmo, or Zelle, or via a credit card or mobile wallet. In certain examples in which the AR electronic device is a mobile device, the AR electronic device is configured to transfer a monetary amount as a donation to a financial account of the charitable organization, from a financial account of a user of the AR electronic device, as a mobile wallet transaction.

In at least one example, the AR electronic device can be configured to display different information by directing (and/or focusing) the AR electronic device on different areas of the logo for a charity, or directing (and/or focusing) the AR electronic device on specific target areas of the logo. That is, the AR electronic device may provide a first augmented reality experience when a first portion of a logo is within the field of view, and a second augmented reality experience when a second, and different portion, of the logo is within the field of view. While described herein primarily in the context of a logo for a charitable organization (also referred to as a charity), in some embodiments, the AR electronic device can be focused on a logo for a business organization that is not a charity (such as a corporation like a financial institution). When the AR electronic device is directed (and/or focused) on the logo for the business organization, a list of charities associated with the business organization can be displayed on the AR electronic device (e.g., as an augmented overlay on the logo for the business organization). Specifically, the AR electronic device can provide a scrollable list that the user can scroll through to view and select a specific charity. When the AR electronic device receives a selection of a specific charity within the displayed scrollable list, an augmented reality presentation of educational information for the specific charity can be displayed on the AR electronic device.

In certain examples provided herein, the charity (i.e., charitable organization) is an organization whose primary objective(s) are philanthropy and/or well-being. For instance, the charity can have the vision, value, or goal to help others and raise money for a certain population of people, such as people having a given need. In some examples, the charity is a nonprofit organization or foundation. Examples of charities can include nonprofit organizations for education, health, arts, culture, heritage, sports, conflict resolution, environmental protection, animal welfare, and other public service interests, to name a few examples.

In an example implementation, the business organization can be a financial institution, such as bank. In this implementation, the bank can be associated with certain charitable organizations that the bank supports regarding charitable pledges or donations. The bank can provide the software application to customers of the bank in order to educate the customers regarding the associated charitable organizations. However, in other examples, the organization may be a different type of organization. For example, the software application can be provided by a health care organizations, or any other type of business organization.

The systems, devices, and methods discussed herein are generally directed to a computing technology that provides a technical solution for using augmented reality technology to both educate a user of an AR electronic device about charitable organizations, and to initiate a donation of money (or a pledge) to a charitable organization, from the AR electronic device. In various examples, a technical solution is provided that involves scanning a logo of a charitable organization with the AR electronic device, thereby triggering educational information regarding the charitable organization to be projected in augmented reality on a display screen of the AR electronic device. The information can be displayed in one or more of text, graphics, sound, video, website links, PDF documents, and animation. In addition, one or more virtual buttons are displayed on the AR electronic device that permit a pledge or donation of money to the charitable organization to be initiated from the AR electronic device. Similar to the displayed educational information, in certain examples, the virtual buttons may be projected in augmented reality on a display screen of the AR electronic device. In certain examples, the described technical solution is an efficient solution that permits a user of the AR electronic device to scan the logo, learn about the charitable organization, and initiate a pledge or donation of money to the charitable organization, simply by viewing the logo and making one or more selections in augmented reality space.

The technical solution provides advantages and benefits including secure payment transactions and authentication/verification by use of a secure identifier, as discussed in more detail later herein. Other advantages and benefits include an integrated payment processing system, via use of a "one-click" payment system and a one-click selection of a payment method, as also discussed later herein. Further advantages and benefits include a real-time and dynamically enhanced learning experience, whereby a business organization and a charitable organization can ascertain times, locations, and times of day where pledges and donations are most likely to occur, an increased level of engagement for customers of the business organization, and increased inclusivity, via the use of videos and animations, for individuals who may have trouble viewing and understanding traditional educational materials (for example on paper, on a poster, etc.)

FIG. 1 shows an example system 100 that can support a charitable giving augmented reality experience. System 100 includes a charity electronic computing device 102, a mobile electronic computing device 104, a network 108, an organization electronic computing device 110, a database 114, payment sources 116, and social media sources 118. Organization electronic computing device 110 includes a charity application engine 112. Also illustrated in FIG. 1 is a logo 106. FIG. 1 illustrates one particular example and arrangement of the system 100, in certain other examples, the system 100 may include more, fewer, or different components than those specifically illustrated and described with reference to FIG. 1.

The example charity electronic computing device 102 is an electronic computing device of a charitable organization. The electronic computing device can be one or more of a desktop computer, a laptop computer, or a mobile computing device, such as a tablet computer or a smartphone. Other electronic computing devices are possible, and in certain examples, the charity electronic computing device 102 may be a plurality of client electronic computing devices. In some examples, a charitable organization can provide a logo and information regarding the charitable organization to the organization electronic computing device 110 via a corresponding charity electronic computing device 102. The charity electronic computing device 102 may be a client device in a client-server model architecture. In such a model, communication with a server over the network 108 may be implemented by a request-response model.

The example mobile electronic computing device 104 is a mobile electronic computing device that includes augmented reality functionality. The mobile electronic computing device is at least one example of an AR electronic device, as discussed and described herein. Accordingly, the mobile electronic computing device (i.e., the AR electronic device of at least one example) can include a camera, or other optical imaging device that is configured to capture one or more images, sequences of images, and/or videos. The camera may have a lens, which defines a field of view of the camera (also referred to herein, generally, as the field of the mobile electronic computing device). In the various examples described herein, the camera may be a digital camera. The logo 106 can be scanned (i.e., imaged) by the camera of the mobile electronic computing device 104 by positioning the logo 106 within the field of view of the mobile electronic computing device. When scanned, the mobile electronic computing device 104 generates one or more scanned images of the logo 106, and the surrounding environment of the logo 106. As further described herein, in various examples, the mobile electronic computing device can project charitable educational information as an overlay of the logo 106 within the scanned imaged of the logo 106.

In one example implementation, the mobile electronic computing device 104 can be a smartphone, tablet, laptop, or other portable electronic computing device 104. In another example, the mobile electronic computing device can be a wearable head-mounted glasses device with augmented reality functionality. In certain examples, a software application can be downloaded (e.g., from an app store) to the mobile electronic computing device 104, and execution of the software application using the mobile electronic computing device 104 can cause the mobile electronic computing device 104 to provide the augmented reality experience described herein. Such experience includes the charitable education and giving functionality discussed herein. While illustrated in FIG. 1 as a single mobile electronic computing device 104 for the convenience of illustration, in various other examples more than one mobile electronic computing device can be coupled to the network 108, and included within the system 104. Each mobile electronic computing device may have a corresponding user or users. For example, a plurality of customers of a business organization (e.g., a financial institution) can each have a mobile electronic computing device installed with the software application.

The example logo 106 illustrated in FIG. 1 is a logo of a charitable organization. The logo can be located on a poster, a magazine, a wall, an electronic display device, or in any another location. As explained in more detail later herein, directing the mobile electronic computing device 104 such that one or more areas of the logo, known as targets, are within a field of view of the mobile electronic computing device 104 can activate a charitable educational presentation on the mobile electronic computing device 104. Directing the mobile electronic computing device 104 such that the logo, or one or more areas or portions of the logo, are within the field of view of the mobile electronic computing device may include focusing the mobile electronic computing device 104.

The example network 108 is a computer network and can be any type of wireless network, wired network and cellular network, including the Internet. Charity electronic computing device 102, mobile electronic computing device 104, payment sources 116, and social media sources 118 can communicate with each other and organization electronic computing device 110 using network 108.

The example organization electronic computing device 110 is an electronic computing device of an organization that can facilitate the charitable education experience. As discussed, in a preferred embodiment, the organization is a financial institution, such as a bank. The organization electronic computing device 110 may include one or more programs or routines, that when executing, provide a development platform that is used to build a charity education software application. That software application can be distributed (e.g., through network 108) to the mobile electronic computing device 104, and installed on the mobile electronic computing device 104 to provide the charitable education experience to the user of the mobile electronic computing device 104.

The organization electronic computing device 110 may include the charity application engine 112, which includes functionality for obtaining a logo and charity information from one or more charity electronic computing device 102, and building the charity education software application for the mobile electronic computing device 104. The charity application engine 112 may also be configured to process donations and pledges received from the mobile electronic computing device 104, and configured to receive and process metadata from the mobile electronic computing device 104 regarding the charity education software application. In some implementations, the operations of the charity application engine 112 can be included in more than one organization computing device 110, or distributed among a plurality of organization computing devices 110 to increase executional efficiency and improve responsiveness. For example, functionality for building the charity education software application can be included on one organization electronic computing device, and functionality for donation and metadata processing can be included on another organization electronic computing device.

The example database 114 is a database associated with the business organization of organization electronic computing device 110. In various examples, the business organization may have associations with a plurality of charitable organizations. Associations may be based on, for instance, visions and goals that align with those of the business organization. For instance, a restaurant (i.e., a business organization) may have an association with one or more charities for preventing poverty. The database 114 can store information related to the charitable organizations, as well as a connection (e.g., a pointer) between the business organization and the one or more associated charities. For example, database 114 can store identification information, including a mailing address, email address, and website for each associated charitable organization. Accordingly, when a particular business organization is read from the database, associations and data information correspond to the associated charities is made readily available. Similarly, when information regarding a charity is read from the database, identification of the associated business organizations is readily available. Database 114 can also store statistics regarding pledges or donations made to the charitable organizations. For example, the statistics can include data such as dollar amounts pledged and donated to specific charitable organizations. The statistics can also include data for individual donors, such as amounts pledged or donated by the individual donors to specific charitable organizations, as well as dates, times and locations from which the pledges and donations were made. In addition, database 114 can store financial account and other personal information for users of mobile electronic computing devices that have one or more financial accounts at the financial organization.

Database 114 can be distributed over a plurality of databases. Organization electronic computing device 110 can be programmed to query (e.g. using Structured Query Language, SQL) database 114 to obtain charity organization related information.

The example payment sources 116 may include one or more third party payment processors, such as PayPal, Venmo, or Zelle. The third party payment processors can process charitable donations from a user of mobile electronic computing device 104 to a charitable organization. In an example implementation, the user can have an account at one or more of the third party payment processors, and can have a money transfer application for an associated third party processor installed on the user's mobile electronic computing device (e.g., mobile electronic computing device 104). When the user selects a control on the mobile electronic computing device 104, the control being associated with a logo for a charity, the mobile electronic computing device can be configured to present a choice of making a donation through one of the money transfer applications for which the user has an account. When a selection of one of the money transfer applications is received, the third party payment processor is sent instructions from the mobile electronic computing device 104 to transfer monetary funds in an amount of the donation from a financial account of the user to a financial account (or financial intermediary) of the selected charity.

The example social media sources 118 are social media entities, such as Facebook and/or Twitter. When a user makes a pledge or a donation to a charity on the mobile electronic computing device 104, the user can post a news item at one of the social media sources 118 regarding the pledge or donation made. For example, the user can make a post to the user's Facebook page that the user donated money to a specific charitable organization. In some examples, when a pledge or donation is made, the AR device provides a notification that allows the user to select one or more controls to automatically post information about the pledge or donation to the user's social media. This can increase awareness and thereby pledges and/or donations by individuals linked to the user through social media.

Figure 2:
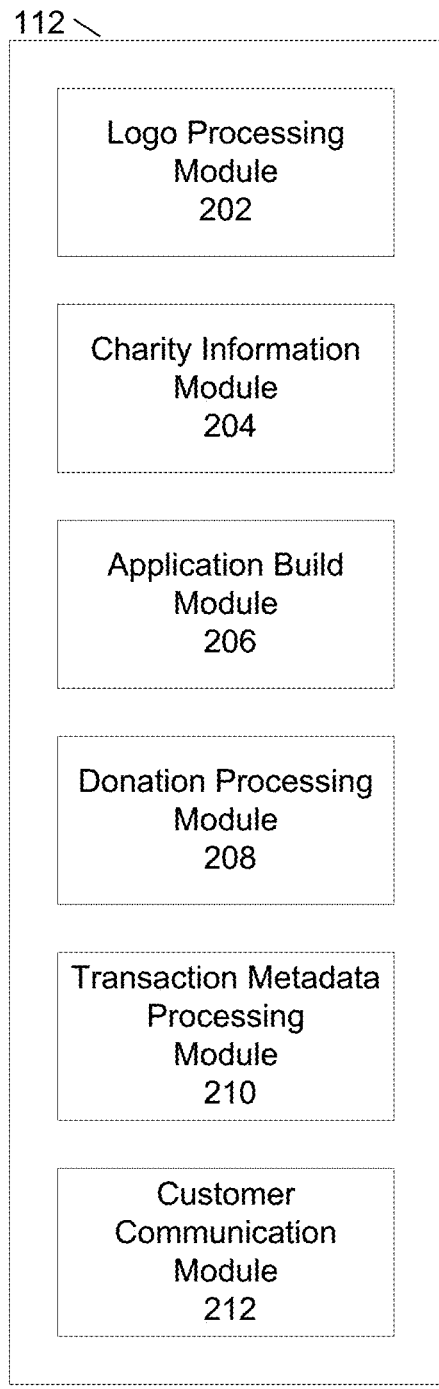
FIG. 2 shows example modules of a charity application engine of the system of FIG. 1.

FIG. 2 illustrates example modules of the charity application engine 112 illustrated in FIG. 1. In one example implementation, charity application engine 112 includes a logo processing module 202, a charity information module 204, an application build module 206, a donation processing module 208, a transaction metadata processing module 210, and a customer communication module 212. While shown in FIG. 2 as being within a single charity application engine 112, in various other examples one or more of the modules shown in FIG. 2 can implemented on separate organization electronic computing devices.

The example logo processing module 202 receives one or more logos from charities participating in the charitable education giving experience. In various examples, the images may be received via a transferred image file. The image file may be received at the charity application engine 112 from the charity electronic computing device (shown in FIG. 1) via a transfer on the network 108 (shown in FIG. 1). The logos, as discussed in more detail later herein, are typically graphics that can be associated with charities, and may be transferred via any suitable graphic file format (e.g., JPEG, PNG, GIF, etc.). The charity electronic computing device 102 may provide one or more graphical user interfaces (GUIs) that permit a user thereof to interact with the charity electronic computing device 102 to designate a logo to be associated with the respective charity. Once the logo is designated, the image file may be transferred to the organization electronic computing device 110. The logo processing module 202 can receive a variety of logos from a variety of charity electronic computing electronic devices, and associate each logo with both a respective charity. Each charity may have at least one corresponding and unique logo. As previously discussed herein, unique presentations of charitable educational information may be associated with each logo. Such information and associations may be read and written to database 114.

The example charity information module 204 receives charitable educational information from the charity electronic computing device 102. In particular, the charitable educational information may be specified by the charity electronic computing device 102, and transmitted to the organization electronic computing device 110. The charitable educational information can include one or more of text, graphics, sound, video, website links, PDF documents, and animations. Such information can be presented to a user of the mobile electronic computing device 104 as an overlay of a logo viewed on the mobile electronic computing device 104. An example of a presentation of the charitable educational information is discussed later herein. The charity information module 204 can receive charitable educational information from a plurality of client computing electronic devices.

The example application build module 206 integrates information regarding the logo, and the charitable educational information associated with the logo, into a software application that can be installed on the mobile electronic computing device 104. The application build module 206 can make use of a third-party augmented reality software application platform, such as Vuforia, to build the software application. In various examples, the platform can also be used to define one or more target areas on the logo that, when within a field of view of the mobile electronic computing device 104, can trigger a display of charitable educational information on the logo. For example, a target area may be a portion of the logo that is less than a whole area of a logo. That is, the entire area of a logo may be divided into target areas, and non-target areas. Target areas may be defined (e.g., using the augmented reality software application platform) by tracing a perimeter (e.g., as a circle) of the target area on a portion of the logo. The augmented reality software application platform can be installed on the organization electronic computing device 110.

The example donation processing module 208 receives and processes pledges and donations to the charitable organizations from users of the mobile electronic computing device 104. The pledges can include an amount of the pledge (or donation) and identification information for the user making the pledge. The identification information can include a name and address of the user and billing information for the user. In some implementations, the donation processing module 208 can bill the user for the pledge. In other implementations, the donation processing module 208 can send the user and billing information to the charitable organization, and the charitable organization can bill the user.

The donation processing module 208 can also receive donations of money for the charitable organization from the user. As explained in more detail later herein, one or more money transfer applications installed on the mobile electronic computing device 104 may be leveraged to transfer a monetary amount of the donation to the charitable institution.

The example transaction metadata processing module 210 can receive metadata from mobile electronic computing device 104 regarding pledges and donations made to a specific charity by the user at mobile electronic computing device 104. In curtained examples, the metadata can include information such as a location and a time of day at which the pledge and/or donation was made, a type of mobile electronic computing device used to make the pledge and/or donation, and the amount of the pledge and/or donation. The transaction metadata can help the business organization improve a campaign of how, when, and where to provide augmented reality charitable giving experience using the mobile electronic computing device (i.e., the AR electronic device). For example, the metadata may indicate that there were more donations at a certain time of the day (relative to another time of the day), for example dinner time, or at locations of certain conferences or other events (relative to other locations).

The example customer communication module 212 provides a mechanism for communicating with a user of the mobile electronic computing device 104 regarding questions the user may have regarding the charity, or regarding any technical issues the user may have regarding making a pledge or a donation. The mobile electronic computing device 104 can provide a virtual button, on a display screen thereof, that the customer can click to initiate a chat session or a video session with an employee of the business organization. For instance, initiation of a video session may open a video GUI within the display screen of the mobile electronic computing 102 device that permits the user to ask any questions the user may have. The video GUI may be a video chat GUI with a video stream between the user and the employee of the business organization.

Figure 3:
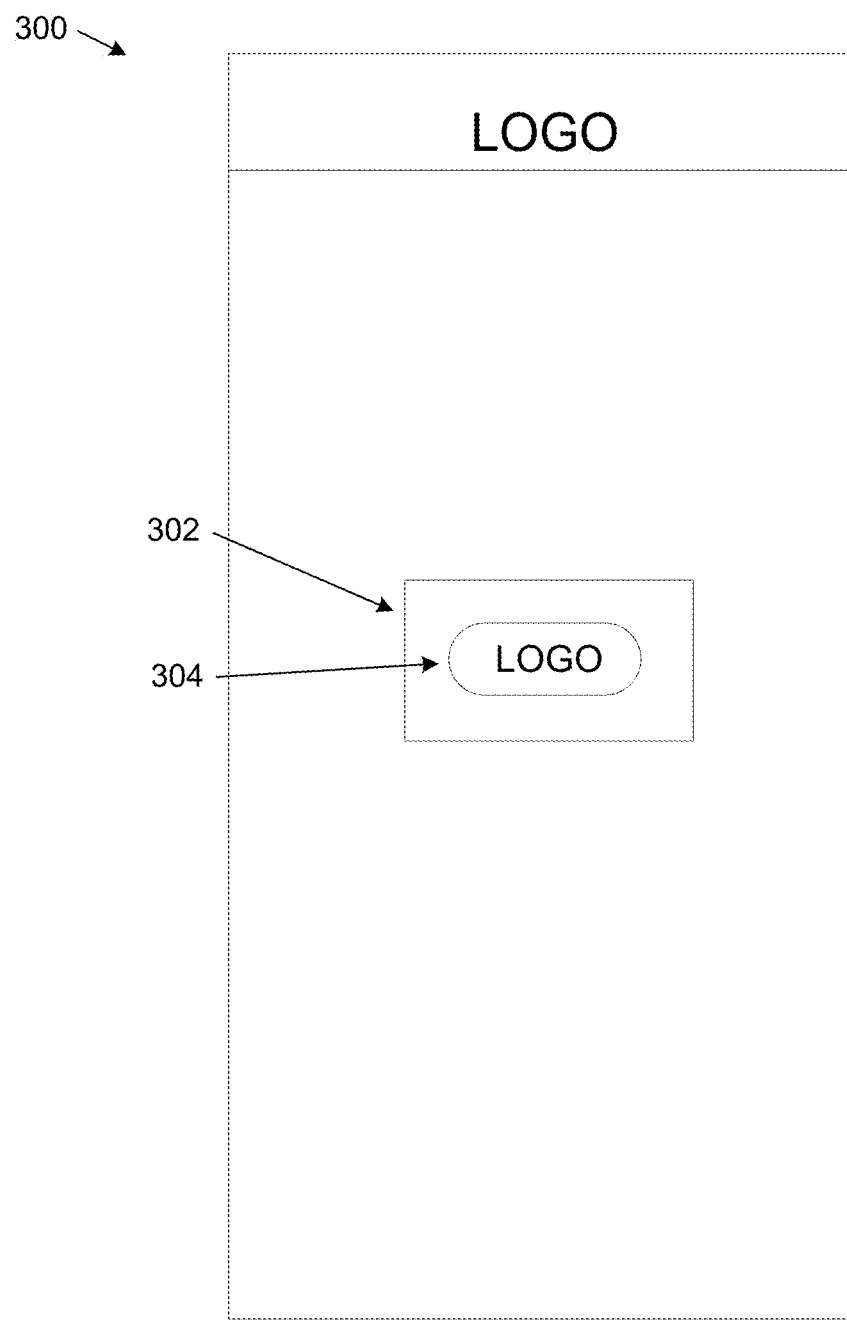
FIG. 3 shows an example graphical user interface (GUI) that is rendered on a mobile electronic computing device of the system of FIG. 1.

FIG. 3 shows an example graphical user interface (GUI) 300 of an example logo 302 that can be displayed on an augmented reality software development kit platform such as Vuforia. As discussed earlier herein, the platform can be hosted on organization electronic computing device 110. Using the augmented reality software development kit platform, a target area 304 can be drawn on the logo 302. In FIG. 3, the target area is shown as a circle that is drawn on the logo 302. The target area can identify a portion of the logo 302 that when positioned within a field of view of the mobile electronic computing device 104 can cause associated charitable organization educational information to be overlaid on logo 302. More or different target areas can be defined on logo 302 using the augmented reality software development kit platform. For instance, a first target area may correspond to a first set of charitable organization educational information, and a second target area may correspond to a second set of charitable organization educational information. Movement of the field of view from the first target area to the second target area causes the first set of charitable organization educational information to transition to the second set of charitable organization educational information. In addition, when the logo 302 is removed from the field of view of the mobile electronic computing device 104, the charitable organization educational information can be removed. In one example, all information/animations, etc. can disappear from a display screen of mobile electronic computing device 104 when logo 302 is removed from the field of view of the mobile electronic computing device 104. The information/animations, etc. would reappear when logo 302 is back in the field of view a second time.

Figure 4:
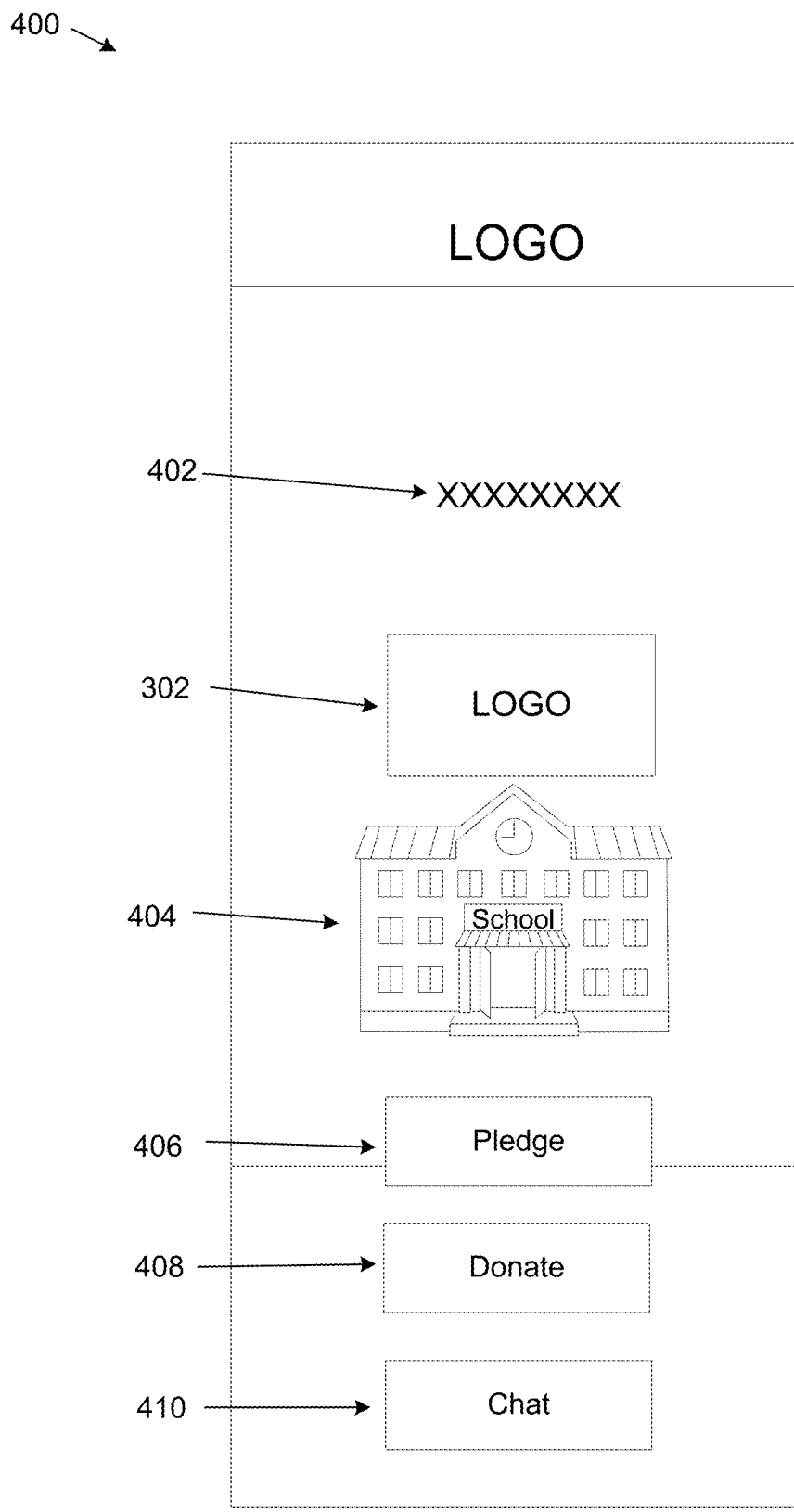
FIG. 4 shows another example GUI that can be rendered on the mobile electronic computing device of FIG. 1.

FIG. 4 shows an example GUI 400 that can be displayed on mobile electronic computing device 104. GUI 400 can be displayed when a user at mobile electronic computing device 104 views the logo 302 and directs (and/or focuses) a camera of the mobile electronic computing device 104 on a target area of the logo 302. As a result of positioning the target area of the logo 302 within the field of view of the mobile electronic computing device 104, charitable educational information is displayed on the mobile electronic computing device 104. For the example GUI 400, the charitable educational information comprises text 402 and a graphic 404. The graphic 404 shows an illustration of a school.

GUI 400 also includes three example virtual buttons 406, 408 and 410. Virtual button 406 permits the user to pledge money to the charity, virtual button 408 permits the user to donate to the charity, and virtual button 410 permits the user to initiate a chat session with an employee of the business organization associated with organization electronic computing device 110. In some implementations, GUI 400 can also or alternatively include a virtual button for initiating a video session with the employee of the business organization. Each virtual button 406, 408 and 410 may be selectable, for instance, by receipt of a touch activation on the mobile electronic computing device 104.

In the example shown, the text 402, graphic 404, and virtual buttons 406, 408 and 410 are virtually overlaid upon the view of the logo 302. This creates the augmented reality environment in which the user is educated about the charitable organization and provided with information and functionality for giving. Other information and functionality beyond what is shown in GUI 400 can be provided, as described herein.

Figure 5:
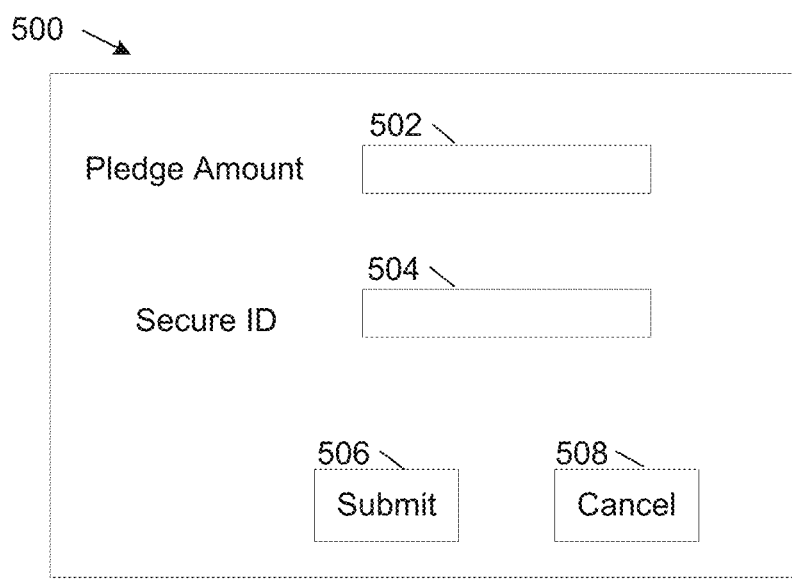
FIG. 5 shows yet another example GUI that can be rendered on the mobile electronic computing device of FIG. 1.

FIG. 5 shows another example GUI 500 that can be displayed on mobile electronic computing device 104. GUI 500 can be displayed when the user at mobile electronic computing device 104 selects virtual button 406 of GUI 400 to pledge money to the charity. That is, in one example, the mobile electronic computing device 104 may transition from GUI 400 to GUI 500 responsive to receipt of a selection (e.g., a user selection by touch activation) of virtual button 406. In certain other examples, GUI 500 may appear as a pop-up window overlayed over GUI 400 responsive to selection of virtual button 406.

GUI 500 includes a virtual edit box 502 for a pledge amount (e.g., a monetary amount) and a virtual edit box 504 for a secure identifier (secure ID). The secure ID is a unique identifier for the user specific to making pledges or donations to a charitable organization at the mobile electronic computing device. For example, the secure ID can be a unique alphanumeric identifier that the user can create and submit to the business organization. The user can register with the business organization as being a candidate for making charitable pledges or donations, and submit the secure ID when registering. In other examples, the secure ID can be a password, token, or other unique identifier, such as a user name/password combination used to access a user's account (e.g., wallet) at the business organization. Because the secure ID is presumably not shared by the user, the secure ID provides a measure of security for the pledge or donation.

When the user selects virtual edit box 502 for the pledge amount, a virtual keyboard can be displayed from which the user can enter the monetary amount the user wants to pledge. When the user selects virtual edit box 504 for the secure ID, the virtual keyboard is displayed and the user can enter a confidential identifier (secure ID) pre-assigned to the user. The secure ID can be a numeric, alphabetic, or alphanumeric identifier. The secure ID can make the donation more secure because the secure ID is only used for pledges and donations, and is different from other identifiers such as user IDs and passwords.

When the user is satisfied with the donation information, the user can select virtual button 506 to submit the pledge amount. Alternatively, the user can select virtual button 508 to cancel the transaction. When virtual button 508 is selected, GUI 400 of FIG. 4 is displayed again.

FIG. 6 shows another example GUI 600 that can be displayed on mobile electronic computing device 104. GUI 600 can be displayed when the user at mobile electronic computing device 104 selects virtual button 408 of GUI 400 to donate money to the charity. That is, in one example, the mobile electronic computing device 104 may transition from GUI 400 to GUI 600 responsive to receipt of a selection (e.g., a user selection by touch activation) of virtual button 408. In certain other examples, GUI 600 may appear as a pop-up window overlayed over GUI 400 responsive to selection of virtual button 408.

GUI 600 includes a virtual edit box 602 for a donation amount (e.g., monetary amount) and a virtual edit box 614 for a secure ID. GUI 600 also includes example payment methods for making the donation. The payment methods correspond to payment sources 116 for which the user has an account, for instance, the payment methods may include one or more money transfer applications (e.g., mobile applications installed on the mobile electronic computing device 104 and associated with the user). Each money transfer application may be associated with a corresponding payment service network. The payment service network may connect a financial account of the user with one of more financial accounts (e.g., banking accounts) of the charity.

For the case of the user of mobile electronic computing electronic device 104, and as illustrated in FIG. 6, the payment options may include PayPal, Venmo, Zelle, a credit card, and a mobile wallet. The credit card is a pre-assigned (by the user) credit card that permits a "one-click" donation to be made via the credit card. The "one-click" donation permits the donation to be made by simply selecting the credit card. The "one-click" donation is possible because information associated with the credit card needed to complete the purchase, such as the user's name and the credit card number, has been previously entered by the user. In the illustrated example, a checkbox 604, 606, 608, 610, 612 is associated with each respective payment option. The user can select one of the checkboxes to select a payment option. For instance, one or more of the checkboxes may receive the user's selection by a touch activation on a display screen of the mobile electronic computing device 104.

For GUI 600, when a payment option is selected, an "x" is displayed within the selected checkbox. As shown in FIG. 6, PayPal is selected by the user. While shown as static payment options in GUI 600, in other examples, payment options may be displayed in a drop-down menu, scrollable list, or other user interactive visual display.

Checkbox 612 for mobile wallet can permit a mobile wallet application on mobile electronic computing device 104 to be used to make a payment to the charitable organization. The mobile wallet application can be previously installed on mobile electronic computing device 104. Selecting checkbox 612 can initiate a payment via the mobile wallet application. Payment information associated with the mobile wallet application can be used by the software application for charitable giving on mobile electronic computing device 104 to implement the donation to the charitable organization. A donation using the mobile wallet can leverage an enhanced security of the mobile wallet (e.g. user authentication/verification) by including the secure ID to complete the donation. In some implementations, when the user has a financial account at the business organization, the mobile wallet application can be configured to make the donation from the financial account.

Before submitting the donation, the user is instructed to enter the pre-assigned secure ID into virtual edit box 614. The user can then select virtual button 616 to submit the donation amount. In at least one example, the secure ID received at virtual edit box 614 is the same secure ID previously described herein with reference to at least FIG. 5. Alternatively, the user can select virtual button 618 to cancel the transaction. When virtual button 618 is selected, GUI 400 of FIG. 4 is displayed again.

Figure 7:
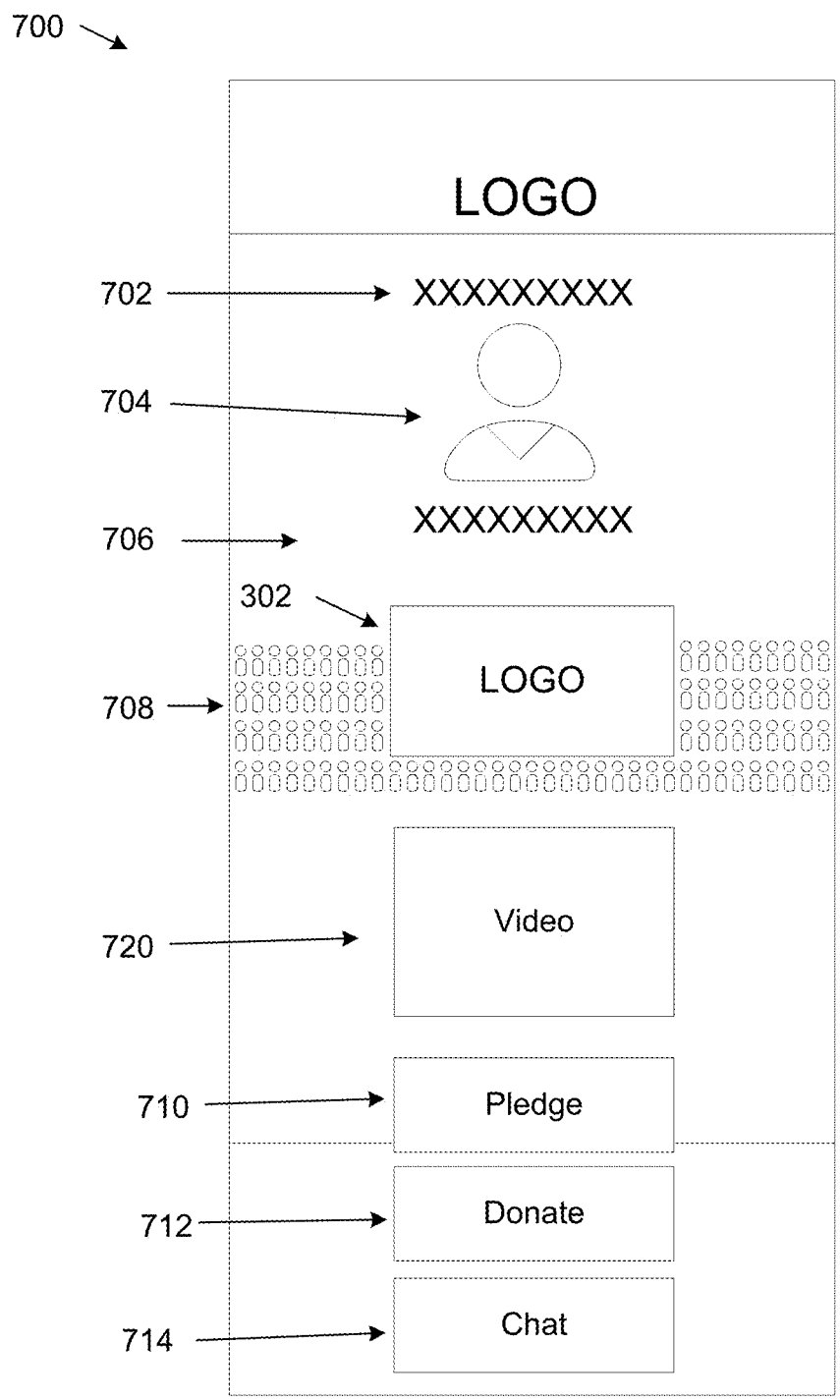
FIG. 7 shows yet another example GUI that can be rendered on the mobile electronic computing device of FIG. 1.

FIG. 7 shows an example GUI 700 that can be displayed on the mobile electronic computing device 104. GUI 700 can be displayed when a user of the mobile electronic computing device 104 views the logo 302 and focuses a camera of the mobile electronic computing device 104 on a target area of the logo 302. For instance, in at least one example, GUI 700 is displayed on the mobile electronic computing device 104 instead of GUI 400 when the target area is within a field of view of the mobile electronic computing device 104. When the target area is within the field of view, one will appreciate that the target area will appear within a scanned image of the logo. While in one example GUI 400 may be initially displayed, and the mobile electronic computing device 104 may transition to GUI 700 from GUI 400, in certain other examples, GUI 700 may be the first interface displayed on the mobile electronic computing device 104. In various examples, pattern recognition, object recognition, other image analysis techniques may be used to identify the presence of the target area within the scanned image of the logo 302.

For the example shown in FIG. 7, as a result of directing the camera on the target area of the logo 302, different charitable educational information is displayed on mobile electronic computing device 104. For the example GUI 700, the charitable educational information includes a graphic 704 with associated text 702, and a graphic 708 with associated text 706. The graphic 704 is a schematic illustration of a teacher. The graphic 708 is a patterned design that partially surrounds the logo 302. As discussed, FIG. 7 illustrates one possible example of the charitable educational information that may be displayed as a visual overlay on the logo 302. In certain other examples, the charitable educational information may be specific to the charity and/or the logo of the charity, and therefore, be different from the charitable educational information illustrated in FIG. 7. For instance, in an example in which the charity is a charity for the advancement of health, the displayed charitable educational information may include text that describes: where the charity is located, what the charity does, why the charity exists, and/or how the charity promotes a healthy lifestyle.

GUI 700 also includes three example virtual buttons 710, 712, and 714. Similar to the virtual buttons previously described with reference to FIG. 4, receipt of a selection of virtual button 710 permits the user to pledge money to the charity, receipt of a selection of virtual button 712 permits the user to donate money to the charity, and receipt of a selection of virtual button 714 permits the user to initiate a chat session with an employee (or other representative) of the business organization associated with organization electronic computing device 110. In some implementations, GUI 700 can also, or alternatively, include a virtual button for initiating a video chat session with the employee of the business organization. In these implementations, receipt of a selection of the video chat session virtual button transitions the GUI 700 to a virtual chat or video chat window.

GUI 700 can also display a video 720 for the user. In certain examples, the video may include content that describes the charitable organization. For example, the video 720 can include animations, video, sound, etc. that provides the user with such information as the mission of the charitable organization and other details on how the charitable organization functions. The video 720 can be displayed as an overlay on the logo 302 within the GUI 700 (as shown), or be displayed within an entirety (e.g., a full screen of the mobile computing device) of the GUI 700. In some examples, the video 720 continues to play from start to finish and repeat (i.e., loop) until an input is received that stops the video 720. In certain other examples, the video 720 and the content thereof is specific to the charity and/or the logo of the charity that is scanned. Accordingly, a video for a first charity may be different from a video of a second charity. While FIG. 7 illustrates one possible example of a GUI 700 that includes a video, other arrangements, alignments, and configurations of the GUI 700 are possible.

Figure 8:
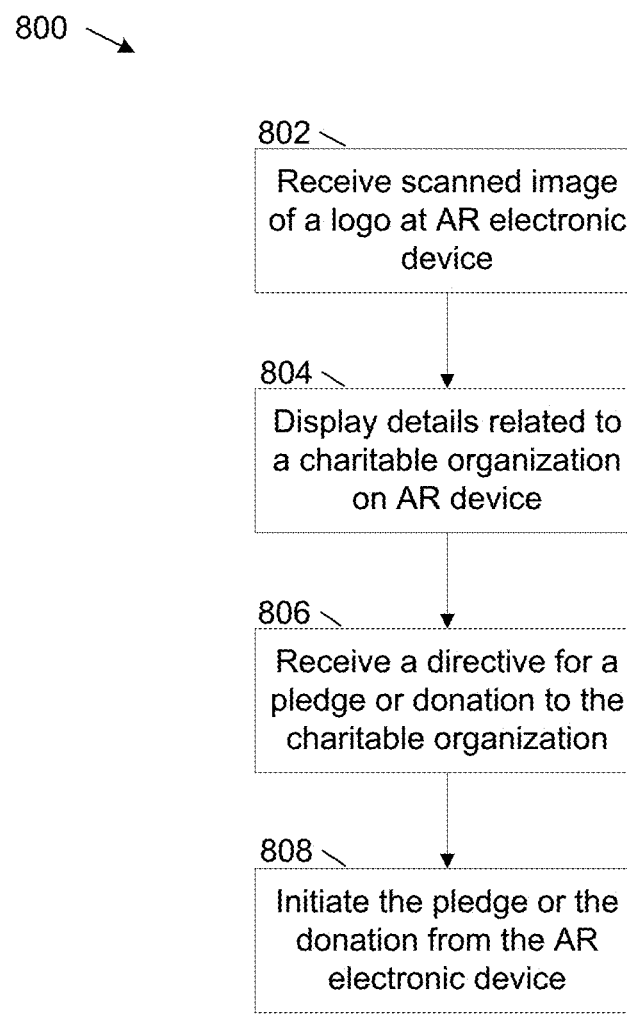
FIG. 8 shows a method for implementing a charitable giving experience using the system of FIG. 1.

FIG. 8 shows a flowchart for an example method 800 for implementing a charitable giving experience on an AR electronic device.

At operation 802, a scanned image of a logo of a charitable organization is received at the AR electronic device. In certain examples, the scanned image is received as a result of positioning the logo within a field of view of an AR electronic device (e.g., the mobile electronic computing device 104 of FIG. 1) and focusing the AR electronic device on the logo. The logo can be located on a poster, on a wall, in a magazine, or on a computer screen, or elsewhere. In some examples, receiving the scanned image of the logo may include generating the image of the logo using one or more digital photography or digital videography techniques. While described in some examples as a scanned image, in certain implementations, the scanned image may include a real-time or near-real-time continuous image stream or video of the logo (and the surrounding environment). The real-time or near-real-time continuous image stream of the logo may appear as a real-time view of the logo (and the surrounding environment) when displayed on the AR electronic device.

At operation 804, after receiving the image of the logo, the logo and details regarding the charitable organization (i.e., charity) are displayed on the AR electronic device. As noted previously, these details can be displayed as an overlay on the logo in an augmented reality environment on the AR electronic device. In examples in which the logo has one or more predetermined target areas, the method 800 may include determining, prior to displaying the logo and the details related to the charity, whether at least a portion of the scanned image corresponds to a predetermined target area of the logo. If the predetermined target area is within the scanned image, the logo and the details related to the charity may be displayed. That is, in certain examples, presence of the predetermined target area within the scanned image of the logo must be present prior to displaying the details related to the charity. However, in other examples, the predetermined target area may correspond to a second (and different) set of details (e.g., education charity information) related to the charity.

As discussed herein, the details can describe one of more aspects of the charitable organization, describe a mission statement or purpose of the charitable organization, or provide other information related to the charitable organization. In some implementations, the details can be displayed as an overlay of the logo. In other implementations, the details can be displayed in conjunction with the logo. For example in these other implementations, the details can be displayed near the logo, for example above or below the logo, instead of as an overlay of the logo.

At operation 806, the method 800 may include displaying a control on the AR electronic device, and receiving a selection of the control on the AR electronic device (illustrated as receiving a directive in FIG. 8). In various examples, the control corresponds to one or more charitable giving opportunities associated with the charity, such as an opportunity for a pledge of money or an opportunity for a donation of money. In at least one example, receiving the selection may include receiving a touch activation of a virtual button on a display screen of the AR electronic device. However, in other examples, other actions may be used to select the virtual button. For instance, the method may include receiving a voice command or receiving a typed command to select the virtual button.

As further discussed herein, in some examples, displaying a control on the AR electronic device may include displaying two or more virtual buttons, each button corresponding to a different charitable giving opportunity. In these examples, the operation 806 may include receiving a selection of a virtual button for pledge of money to the charitable organization, or receiving a selection of a virtual button for a donation of money to the charitable organization.

At operation 808, the pledge or donation to the charitable organization is initiated from the AR electronic computing device. When a directive for a pledge is received, both a pledge amount and a secure identifier are received at the AR device. The pledge amount, the secure identifier, and an identifier for the charitable organization are transmitted to an electronic computing device of a business organization, for example a financial institution, such as a bank, which has an association with the charitable organization, and which provides the secure identifier to the user.

In various examples, the logo permits the AR electronic device to identify the charitable organization, and therefore, the associated details to be displayed on the AR electronic device. In an example implementation, the logo is scanned by the AR electronic device, and the logo is identified by comparing the scanned image of the logo with images of other logos stored on organization electronic computing device 110 or database 114. The secure identifier permits the business organization to identify the user, and obtain personal information regarding the user, such as a mailing address, an email address, and a telephone number. The business organization can then send the pledge information, along with the name of the user, the pledge amount, and other pertinent information regarding the user, to the charitable organization. The charitable organization can then bill the user for the amount of the pledge, send an email to the user with a link to a website of the charitable organization from where the user can pay the pledge amount, or communicate with the user in some other way.

When a directive for a donation is received, in addition to receiving a donation amount and a secure identifier, a payment method is also received at the AR electronic device. The payment method can be via a money transfer application or a credit card that has been pre-assigned by the user. The money transfer application can be one for which the user has an account and for which a software application for the money transfer application is installed on the AR electronic device. Examples of money transfer applications may include PayPal, Venmo and Zelle. The selected money transfer application is then used to complete the donation to the charitable organization.

Figure 9:
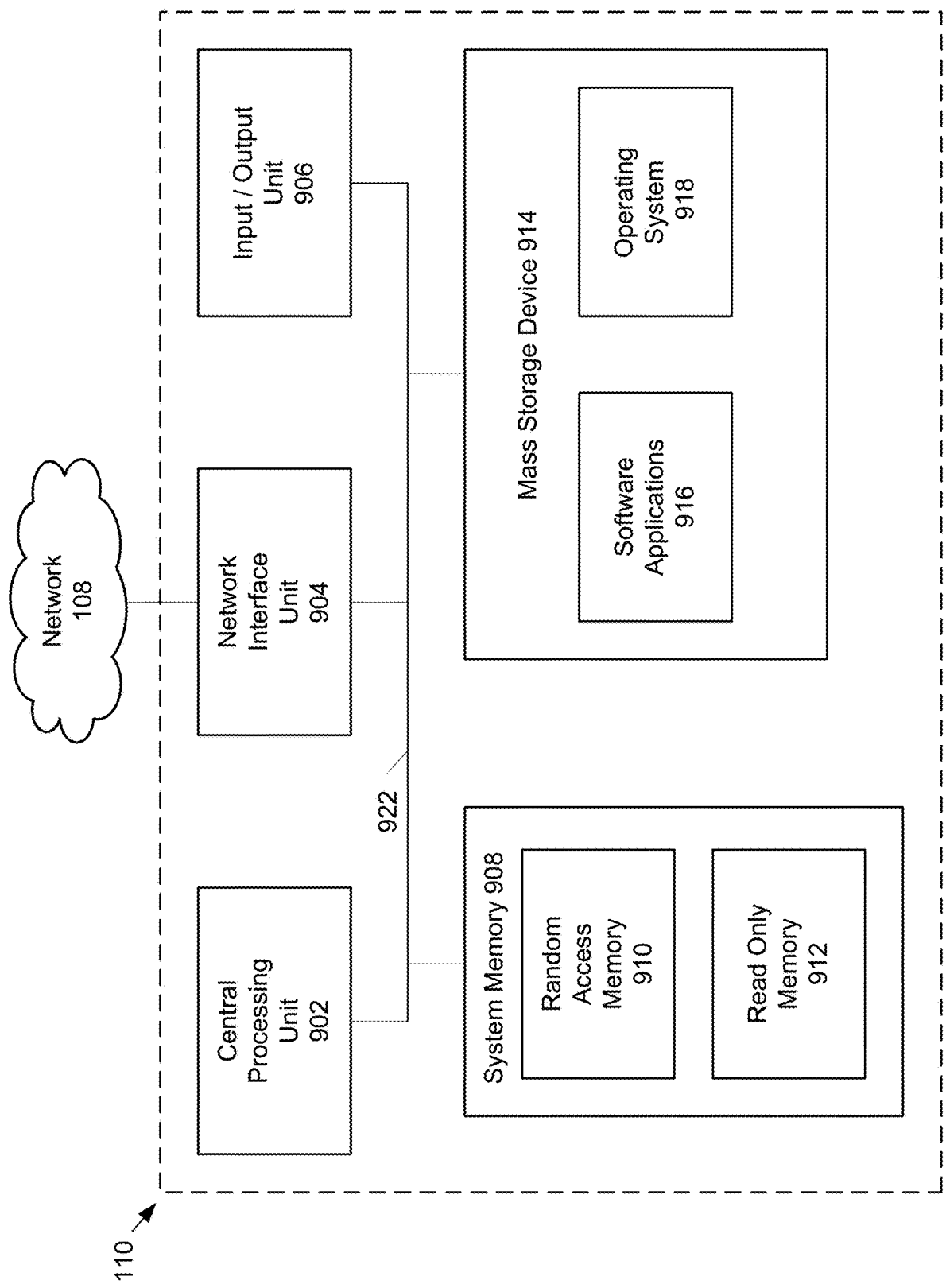
FIG. 9 shows example physical components of an example organization electronic computing device of the system of FIG. 1.

As illustrated in the example of FIG. 9, organization electronic computing device 110 includes at least one central processing unit ("CPU") 902, also referred to as a processor, a system memory 908, and a system bus 922 that couples the system memory 908 to the CPU 902. The system memory 908 includes a random access memory ("RAM") 910 and a read-only memory ("ROM") 912. A basic input/output system that contains the basic routines that help to transfer information between elements within the organization electronic computing device 110, such as during startup, is stored in the ROM 912. The organization electronic computing device 110 further includes a mass storage device 914. The mass storage device 914 is able to store software instructions and data. Some or all of the components of the organization electronic computing device 110 can also be included in charity electronic computing device 102 and mobile electronic computing device 104.

The mass storage device 914 is connected to the CPU 902 through a mass storage controller (not shown) connected to the system bus 922. The mass storage device 914 and its associated computer-readable data storage media provide non-volatile, non-transitory storage for the organization electronic computing device 110. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the organization electronic computing device 110.

According to various embodiments, the organization electronic computing device 110 may operate in a networked environment using logical connections to remote network devices through the network 108, such as a wireless network, the Internet, or another type of network. The organization electronic computing device 110 may connect to the network 108 through a network interface unit 904 connected to the system bus 922. It should be appreciated that the network interface unit 904 may also be utilized to connect to other types of networks and remote computing systems. The organization electronic computing device 110 also includes an input/output controller 906 for receiving and processing input from a number of other devices, including a touch GUI display screen, or another type of input device. Similarly, the input/output controller 906 may provide output to a touch GUI display screen or other type of output device.

As mentioned briefly above, the mass storage device 914 and the RAM 910 of the organization electronic computing device 110 can store software instructions and data. The software instructions include an operating system 918 suitable for controlling the operation of the organization electronic computing device 110. The mass storage device 914 and/or the RAM 910 also store software instructions and software applications 916, that when executed by the CPU 902, cause the organization electronic computing device 110 to provide the functionality of the organization electronic computing device 110 discussed in this document. For example, the mass storage device 914 and/or the RAM 910 can store software instructions that, when executed by the CPU 902, cause the organization electronic computing device 110 to display received data on the display screen of the organization electronic computing device 110.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for implementing a charitable giving experience, the method comprising:
receiving a scanned image of a logo of a charity at an augmented reality (AR) electronic device, the logo including a graphic associated with the charity;
determining, prior to displaying the logo and details related to the charity on the AR electronic device, whether at least a portion of the scanned image corresponds to a predetermined target area of the logo;

when the at least portion of the scanned image corresponds to the predetermined target area of the logo, displaying at least the logo and the details related to the charity on the AR electronic device;

displaying a control on the AR electronic device, wherein the control corresponds to one or more charitable giving opportunities associated with the charity;

receiving a selection of the control on the AR electronic device; and initiating a charitable giving to the charity from the AR electronic device.

2. The method of claim 1, wherein displaying the details related to the charity comprises displaying the details as an overlay on the logo on the AR electronic device.

3. The method of claim 2, wherein displaying the details related to the charity comprises displaying at least one of an animation, a video, and educational information related to the charity on the AR electronic device.

4. The method of claim 1, wherein the charitable giving is a pledge of money for the charity.

5. The method of claim 4, wherein initiating the charitable giving comprises:
receiving a secure identifier of a user of the AR electronic device and a monetary amount of the pledge; and
sending to an electronic computing device the secure identifier, the monetary amount of the pledge, and an identifier of the charity.

6. The method of claim 1, wherein the charitable giving is a donation of money to the charity.

7. The method of claim 6, further comprising:
responsive to receiving the selection of the control, displaying one or more money transfer applications on the AR electronic device, the one or more money transfer applications being installed on the AR electronic device and associated with a user of the AR electronic device; and
receiving a selection of a one of the money transfer applications.

8. The method of claim 7, wherein initiating the charitable giving comprises:
receiving a secure identifier of the user and a monetary amount of the donation; and
initiating a transfer of money to the charity for the monetary amount of the donation using the selected one of the money transfer applications.

9. The method of claim 8, wherein the selected one of the money transfer applications implements a single-click credit card transaction.

10. The method of claim 1, wherein the control is a virtual button that is projected on a display screen of the AR electronic device.

11. The method of claim 1, further comprising receiving a secure identifier at the AR electronic device, the secure identifier authenticating a user of the AR electronic device, wherein the secure identifier is an identifier that is assigned to the user specifically for making pledges or donations on the AR electronic device.

12. An augmented reality (AR) electronic computing device, comprising:
a camera;
a display screen;
at least one processor; and
system memory, the system memory including instructions which, when executed by the processor, cause the AR electronic computing device to:

receive a scanned image of a logo of a charity from the camera, the logo including a graphic associated with the charity;

determine, prior to displaying the logo and details related to the charity on the AR electronic computing device, whether at least a portion of the scanned image corresponds to a predetermined target area of the logo;

when the at least portion of the scanned image corresponds to the predetermined target area of the logo, display at least the logo and the details related to the charity on the display screen;

display a control on the display screen, wherein the control corresponds to a pledge of money or a donation associated with the charity;

receive a selection of the control; and initiate the pledge or the donation to the charity from the AR electronic computing device.

13. The AR electronic computing device of claim 12, wherein the instructions further cause the processor to display the details related to the charity as an overlay on the logo on the AR electronic computing device.

14. The AR electronic computing device of claim 12, wherein the instructions further cause the processor to:
determine whether the selection of the control indicates the pledge of money to the charity;
when a determination is made that the selection of the control indicates the pledge of money for the charity:
receive a secure identifier of a user of the AR electronic computing device and a monetary amount of the pledge; and
send to an electronic computing device the secure identifier, the monetary amount of the pledge, and an identifier of the charity.

15. The AR electronic computing device of claim 12, wherein the instructions further cause the processor to:
display a selection of one or more money transfer applications installed on the AR electronic computing device and associated with a user of the AR electronic computing device;
receive a selection of a one of the money transfer applications;
receive a secure identifier of the user and a monetary amount of the donation; and
use the selected money transfer application, initiating a transfer of money to the charity for the monetary amount of the donation.

16. The AR electronic computing device of claim 12, wherein the control is a virtual button that is projected by the AR electronic computing device.

17. The AR electronic computing device of claim 12, wherein the details related to the charity comprise text and graphics related to the charity.

18. The AR electronic computing device of claim 12, wherein display the details related to the charity comprise displaying an animation or a video related to the charity.

19. A method implemented on an augmented realty (AR) electronic device for implementing a donation of money to a charity, the method comprising:
receiving a scanned image of a logo of the charity at the AR electronic device, the logo including a graphic associated with the charity;
determining, prior to displaying the logo and details related to the charity on the AR electronic device, whether at least a portion of the scanned image corresponds to a predetermined target area of the logo;

when the at least portion of the scanned image corresponds to the predetermined target area of the logo, displaying the logo and a virtual button on the AR electronic device, the virtual button being displayed as an overlay on the logo, wherein the virtual button corresponds to a donation of money to the charity;

receiving a first selection of the virtual button on the AR electronic device;

responsive to receiving the first selection of the virtual button, displaying one or more money transfer applications on the AR electronic device, the one or more money transfer applications being installed on the AR electronic device and associated with a user of the AR electronic device;

receiving a second selection of a one of the money transfer applications;

receiving an input indicating a monetary amount for the donation of money; and initiating a transfer of money to the charity for the monetary amount of the donation using the selected one of the money transfer applications.

\* \* \* \* \*